United States Patent [19]

Wilgus et al.

[11] 4,088,586

[45] May 9, 1978

[54] MANNICH BASE COMPOSITION

[75] Inventors: Donovan R. Wilgus, Richmond; John M. King, San Rafael, both of Calif.

[73] Assignee: Chevron Research Company, San Francisco, Calif.

[21] Appl. No.: 693,807

[22] Filed: Jun. 7, 1976

[51] Int. Cl.$^2$ .............................................. C10M 1/34
[52] U.S. Cl. .......................... 252/51.5 R; 260/570.5 P
[58] Field of Search .................................. 252/51.5 R; 260/570.5 P

[56] References Cited

U.S. PATENT DOCUMENTS

| | | | |
|---|---|---|---|
| 3,036,003 | 5/1962 | Verdol | 252/51.5 R |
| 3,429,812 | 2/1969 | Kivelevich et al. | 260/570.5 P |
| 3,678,000 | 7/1972 | Adams et al. | 260/570.5 D |
| 3,798,165 | 3/1974 | Piasek et al. | 252/51.5 R |

FOREIGN PATENT DOCUMENTS 1,007,338  10/1965  United Kingdom.

OTHER PUBLICATIONS

Gordash et al., Chem. Abst. 83 (1975) No. 134611.

*Primary Examiner*—Arthur P. Demers
*Attorney, Agent, or Firm*—C. J. Tonkin; L. L. Vaughan

[57] ABSTRACT

A new Mannich base, prepared by condensing tetrapropenylphenol, formaldehyde and diethylenetriamine wherein the molar ratio of reactants is 1 mol tetrapropenylphenol to 0.5 to 0.85 mols formaldehyde to at least 0.3 mols of diethylenetriamine, and the calcium salt thereof are useful as dispersant additives for lubricating oils, particularly for use in marine cylinder lubricating oils.

11 Claims, No Drawings

MANNICH BASE COMPOSITION

This invention relates to novel Mannich bases and their uses as lubricating oil additives.

BACKGROUND OF THE INVENTION

For a variety of reasons, higher-sulfur-content fuels are now being used, particularly in marine engines. This high sulfur content leads to the formation, in the presence of oxygen, of corrosive sulfur acids, particularly sulfuric acid. To prevent damage to the engine from these sulfur acids, they must be neutralized with a basic material. This basic material is ordinarily an additive in the oil used to lubricate the engine. As higher-sulfur-content fuels are used, a greater and greater reservoir of alkalinity must be included in the lubricating oil to neutralize the acid. However, using conventional additives, such as calcium phenates, an increase in the amount of additive leads to an increase in ash formation, which is detrimental to the engine.

It is an object of this invention to provide a lubricating oil additive which is effective in neutralizing sulfur acids. It is a further object to provide an additive which can neutralize large quantities of these acids with lower resultant ash formation than for conventional additives.

DESCRIPTION OF THE PRIOR ART

U.S. Pat. No. 3,036,003 teaches the use in lubricating oils of a combination of a detergent amount of a basic alkaline earth metal petroleum sulfonate and the condensation product of an alkyl-substituted phenol in which the alkyl group contains from 4 to 20 carbon atoms, formaldehyde and an alkylene polyamine and the alkaline earth metal salts thereof. The molar ratio of the reactants for this condensation product are 0.5 to 2 mols of each of the phenol and formaldehyde for each nitrogen atom present in the polyamine.

U.S. Pat. No. 3,649,229 teaches the use of high-molecular-weight Mannich reaction products as additives for hydrocarbon fuels. The condensation product is prepared by reacting a high-molecular-weight alkyl hydroxy aromatic compound having a molecular weight of from about 600 to 3000 with an amine and an aldehyde. The molar ratio of the reactants is 1:0.1–10:0.1–10. A specific example teaches the preparation of a Mannich condensation product from polypropylphenol of 900 molecular weight with diethylenetriamine and paraformaldehyde in the ratio 1:0.75:1.

SUMMARY OF THE INVENTION

The Mannich base prepared from tetrapropenylphenol, formaldehyde and diethylenetriamine when the molar ratio of the reactant is 1 mol tetrapropenylphenol to 0.5 to 0.85 mol formaldehyde to at least 0.3 mol of diethylenetriamine has outstanding viscosity and alkalinity value properties. The calcium salt of this Mannich base condensation product is very useful as an additive for lubricating oil compositions.

DETAILED DESCRIPTION OF THE INVENTION

The phenol used in the preparation of the condensation product of this invention is tetrapropenylphenol. Tetrapropenylphenol is prepared by alkylating phenol with a propylene tetramer. It is also known as dodecylphenol.

Formaldehyde or a formaldehyde precursor such as paraformaldehyde is used to prepare the condensation product of this invention. The amine which is condensed with the tetrapropenylphenol and the formaldehyde is diethylenetriamine.

The Mannich base is prepared by condensing the tetrapropenylphenol and the diethylenetriamine with formaldehyde at a temperature of 25° to 140° C, preferably 25° to 130° C, and in the presence of any suitable solvent such as benzene or toluene, which can be recovered from the reaction product. If desired, the reaction may be carried out in a mineral lubricating oil and the condensation product is recovered as a lubricating oil concentrate.

The calcium salt of the Mannich base is prepared using conventional methods, for example, by treating the Mannich base with calcium hydroxide in the presence of a promoter, such as water, ethylene glycol, 1,3-propane diol, 1,4-butane diol, diethylene glycol, butyl cellosolve, propylene glycol, 1,3-butylene glycol, methyl carbitol, diethanol amine, N-methyldiethanol amine, dimethylformamide, N-methylacetamide or dimethylacetamide. Preferred promoters are water, ethylene glycol and dimethylacetamide. Most preferred is ethylene glycol. The reaction is carried out at 100° to 175° C. After the reaction is completed, the product is stripped at 175° C and 20 mm mercury to remove any unreacted starting materials, especially polyamine.

The Mannich base and the calcium salt thereof of this invention provide a high alkalinity value.

Alkalinity value is one method of specifying the degree of overbasing of the phenate portion of the Mannich base. The method for determining the alkalinity value of an overbased composition is set forth in ASTM Method D-2896. Briefly, the alkalinity value is stated as the number of milligrams of potassium hydroxide per gram of composition to which the overbasing is equivalent. For example, if the composition is overbased to the extent that it has the same acid neutralizing capacity per gram as 10 mg of potassium hydroxide, the composition is given an alkalinity value of 10. The lower limit of alkalinity value is 0 for a neutral phenate. Values of 200 to 260 are especially desirable for use in lubricants which are exposed to the decomposition products of sulfur-containing diesel fuels. Further, the high alkalinity value is achieved with a lower amount of ash (from the calcium salt) than would be present if conventional metal phenate additives were used.

Most importantly, the Mannich bases have a sufficiently low viscosity to enable their preparation using conventional process equipment. Their calcium salts products have a viscosity of from about 1800 to 2200 Saybolt Universal Seconds (SUS) at 99° C.

The lubricant composition is prepared by admixing through conventional mixing techniques the appropriate amount of the Mannich base or the calcium salt of the Mannich base with a lubricating oil. The selection of particular base oil depends upon the contemplated application of the lubricant and the presence of other additives. Generally, the amount of the calcium salt of the Mannich base used in the lubricating oil will vary from 0.3 to 35% by weight, and preferably from 3 to 30% by weight.

The lubricating oil which may be employed in this invention includes a wide variety of hydrocarbon oils such as naphthenic base, paraffin base and mixed base oils. The lubricating oils may be used individually or in combination, and generally have a viscosity which ranges from 50 to 5000 SUS and usually from 100 to 1500 SUS at 38° C.

Particularly good results are obtained with the lubricating oil compositions of this invention when an alkenyl succinimide is present to act as a dispersant. Alkenyl succinimides are well known and are the reaction products of a polyolefin polymer-substituted succinic anhydride with an amine, preferably a polyalkylene amine. The polyolefin polymer-substituted succinic anhydrides are obtained by reaction of a polyolefin polymer or a derivative thereof with maleic anhydride. The succinic anhydride thus obtained is reacted with the amine. The preparation of the alkenyl succinimide has been described many times in the art, see for example, U.S. Pat. No. 3,390,082. Particularly good results are obtained when the alkenyl succinimide is a polyisobutene substituted succinic anhydride of a polyalkylene polyamine. The polyisobutene from which the polyisobutene substituted succinic anhydride is obtained by polymerizing isobutene and can vary widely in its compositions. The average number of carbon atoms can range from 30 or less to 250 or more with the resulting number average molecular weight of about 400 or less to 3000 or more. Preferably, the average number of carbon atoms per polyisobutene molecule will range from about 50 to about 100 will have a number average molecular weight of about 600 to 1500. More preferably, the average number of carbon atoms per polyisobutene molecule ranges from about 60 to about 90 and the number average molecular weight ranges from about 800 to 1300. The polyisobutene is reacted with maleic anhydride according to well-known procedures to yield the polyisobutene substituted succinic anhydride.

When substituted succinic anhydride is reacted with a polyalkylene polyamine to yield the corresponding succinimide, each alkylene radical of the polyalkylene polyamine usually has up to about 8 carbon atoms. The alkylene radical is exemplified by ethylene, propylene, butylene, trimethylene, tetramethylene, pentamethylene, hexamethylene, octamethylene, and so forth. The number of amino groups, generally but not necessarily, is one greater than the number of alkylene radicals present in the amine, that is, if a polyalkylene polyamine contains 3 alkylene radicals, it will usually contain 4 amino radicals. The number of amino radicals can range up to about 9. Preferably, the alkylene radical contains from about 2 to about 4 carbon atoms and all amine groups are primary or secondary. In this case, the number of amine groups exceeds the number of alkylene groups by 1. Preferably, the polyalkylene polyamine contains from 3 to 5 amine groups. Specific examples of a polyalkylene polyamine include ethylenediamines, diethylenetriamine, triethylenetetraamine, propylenediamine, tripropylenetetraamine, tetraethylenepentamine, trimethylenediamine, pentaethylenehexamine, di(trimethylene)triamine, tri(hexamethylene)tetraamine and so forth. Preferably, the alkenyl succinimides used in the compositions of this invention are the reaction product of polyisobutenyl succinic anhydride wherein the polyisobutenyl group has between 60 and 90 carbon atoms and the number average molecular weight of about 800 to 1300 with tetraethylenepentaamine or triethylenetetraamine.

The alkylene succinimide acts as a dispersant and can be present in the oil in a wide variety of ranges, normally from about 1% to about 10% of the total lubricating oil composition. Preferably, the succinimide is present in the lubricating oil composition at a range from about 2 to about 8% by weight of the total composition.

As desired, other additives may be included in the lubricating oil compositions of this invention. These additives include antioxidants or oxidation inhibitors, rust inhibitors, anticorrosive agents, and so forth. Of particular interest are overbased phenates. Other types of lubricating oil additives which may be employed include antifoam agents, stabilizers, antistain agents, tackiness agents, antichatter agents, dropping point improvers, anti-squawk agents, extreme pressure agents, odor control agents, dispersants, detergents and the like.

In many instances it may be advantageous to form concentrates of the Mannich base or the salt of the Mannich base of this invention within a carrier liquid. These concentrates provide a convenient method of handling and transporting the additive compounds of this invention before their subsequent dilution and use. The concentration of the Mannich base or the calcium salt of the Mannich base within the concentrates may vary from 90 to 30% by weight, although it is preferred to maintain the concentration between about 50 and 70% by weight.

The following examples are presented to illustrate the practice of specific embodiments of this invention and should not be interpreted as limitations upon the scope of the invention.

EXAMPLE 1

To a two-liter, three-neck flask is charged 230 g of mid-continent neutral lubricating oil having a viscosity of 100 SUS at 38° C. 540 g (2 mols) of tetrapropenylphenol and 103 g (1 mol) of diethylenetriamine were added. The reaction mixture spontaneously heated to 38° C. To the mixture was added 48 g of paraformaldehyde which provides 1.5 mols formaldehyde. The reaction mixture heated to 50° C and then was heated to 125° C over a period of 1 hour. The reaction mixture was maintained at 125° to 130° C for an additional hour and then was stripped under vacuum to remove last traces of water (30 g). To the reaction mixture was then added 124 g (2 mols) of ethylene glycol and 74 g (1 mol) calcium hydroxide. The reaction mixture was heated to 175° C over a period of one hour. It was then stripped under vacuum of 20 mm Hg to a maximum bottoms temperature of 175° C until the overhead temperature dropped rapidly. 900 g of product were obtained. This product contained 25.5% oil. To the product was added 100 additional grams of mid-continent neutral oil yielding 1000 g (33% oil) of product as a lubricating oil concentrate. This concentrate was filtered through diatomaceous earth and yielded a final product having an alkalinity value of 240.7 mg of KOH per gram. Alkalinity value was measured by ASTM method D-2896. It had viscosity at 99° C of 1806 Saybolt Universal Seconds. It contained 3.25% nitrogen and 3.68% calcium.

EXAMPLE 2

Example 4 of U.S. Pat. No. 3,036,003 was repeated in the laboratory by reacting para-tert-octylphenol with formaldehyde and diethylenetriamine in the ratio 1:1:0.5. Table I below also reports the results of various experiments run at different molar ratios for paratert-octylphenol and for tetrapropenylphenol.

TABLE I

| | | Charge Mol Ratio Alkylphenol/ Formaldehyde/ DETA | Concentration of Salt in Oil, % | Alkalinity Value D-2896 | % Ca | % N | Viscosity at 99° C SUS |
|---|---|---|---|---|---|---|---|
| | Analysis and Properties of Calcium Salts of Alkylphenol Mannich Bases | | | | | | |
| 1. | p-tert-octylphenol | 1/1/0.5[1] | 41.5[1] | 155[a,1] | 2.86[1] | 2.75[1] | 303[b,1] |
| | " | 1/0.75/0.5 | 67 | 282 | 4.65 | 3.22 | 43,359[c] |
| | " | " | 40 | 189 | 2.67 | 2.90 | 229[b] |
| | " | " | 40 | 183 | 2.62 | 2.85 | 252[c] |
| 2. | tetrapropenylphenol | 1/1/0.5 | 67 | 246 | 3.72 | 3.54 | 3,468 |
| | " | 1/0.75/0.5 | " | 241 | 3.68 | 3.25 | 1,806 |

[a]This value was obtained using ASTM D-664 method.
[b]Unstripped product.
[c]Stripped under vacuum, maximum bottoms temp. 178° C at 20 mm Hg.
[1]Data from U.S. 3,036,003

As can be seen from these examples, the charge mol ratio in a preparation of a calcium salt of a Mannich base from tetrapropenylphenol is very critical for a useful product having a low viscosity and a high alkalinity value.

What is claimed is:

1. The condensation product of tetrapropenylphenol, formaldehyde and diethylenetriamine wherein the molar ratio of reactants is 1 mol tetrapropenylphenol to 0.5 to 0.85 mol formaldehyde to at least 0.3 mol diethylenetriamine.

2. The calcium salt of the product of claim 1.

3. The product of claim 2 wherein the molar ratio of reactants is 1 mol tetrapropenylphenol to 0.6 to 0.8 mol of formaldehyde to 0.3 to 1 mol diethylenetriamine.

4. The product of claim 3 wherein the molar ratio of reactants is 1 mol phenol to 0.75 mol formaldehyde to 0.5 mol diethylenetriamine.

5. A lubricating oil composition containing a dispersant amount of the product of claim 2.

6. A lubricating oil composition containing from 0.3 to 35% by weight of the product of claim 3.

7. A lubricating oil composition containing from 3.0 to 30% by weight of the product of claim 4.

8. The composition of claim 7 which also contains 1–10% of an alkenyl succinimide dispersant.

9. A lubricating oil concentrate containing 10–70% by weight of an oil of lubricating viscosity and 90–30% by weight of the product of claim 2.

10. A lubricating oil concentrate containing 30–50% by weight of an oil of lubricating viscosity and 70–50% by weight of the product of claim 4.

11. A process for the preparation of the product of claim 1 which comprises condensing 1 mol of tetrapropenylphenol with 0.5 to 0.85 mol formaldehyde and at least 0.3 mol of diethylenetriamine.

* * * * *